United States Patent [19]
Linton et al.

[11] Patent Number: 5,684,338
[45] Date of Patent: Nov. 4, 1997

[54] SECURITY DEVICE

[75] Inventors: Rodney Phillip Linton, Wantirna South; Janis Eglinsch-Veglinsch, Ivanhoe; Wolfgang Matuschek, Patterson Lakes, all of Australia

[73] Assignee: Robert Bosch GmbH, Stuttgart, Germany

[21] Appl. No.: 777,801

[22] Filed: Dec. 31, 1996

Related U.S. Application Data

[63] Continuation of Ser. No. 411,781, filed as PCT/DE93/00953, Dec. 8, 1993, published as WO94/08823 Apr. 28, 1994, abandoned.

[30] Foreign Application Priority Data

Oct. 8, 1992 [AU] Australia ................... PL 5159

[51] Int. Cl.[6] ................... B60R 25/00; H01H 27/06
[52] U.S. Cl. ................... 307/10.2; 307/10.3; 307/10.4; 307/10.5; 180/287; 340/825.31
[58] Field of Search ................... 307/9.1–10.8; 180/287; 340/425.5, 426, 428, 430, 825.31, 825.34, 825.36, 825.69, 825.72; 364/423.098, 423.099, 424.037, 424.045, 424.057; 235/382; 123/198 B

[56] References Cited

U.S. PATENT DOCUMENTS

| | | | |
|---|---|---|---|
| 4,749,873 | 6/1988 | Mutoh et al. | 307/10.2 |
| 5,079,435 | 1/1992 | Tanaka | 307/10.2 |
| 5,229,648 | 7/1993 | Sues | 307/10.2 |

FOREIGN PATENT DOCUMENTS

| | | |
|---|---|---|
| 68203/90 | 12/1989 | Australia. |
| 0191934 | 8/1986 | European Pat. Off.. |
| 0351183 | 1/1990 | European Pat. Off.. |
| 2454503 | 11/1980 | France. |
| 2487274 | 1/1982 | France. |
| 2251503 | 7/1992 | United Kingdom. |
| 2289357 | 11/1995 | United Kingdom ............ 307/10.5 |

*Primary Examiner*—Jonathan Wysocki
*Assistant Examiner*—Peter Ganjian
*Attorney, Agent, or Firm*—Spencer & Frank

[57] ABSTRACT

A security device which is particularly suitable for motor vehicles is proposed. It comprises an electronic control unit (10) for controlling the functions of an apparatus to be protected, at least two sensors ($U_1$, $U_2$) for detecting specific operating states of the apparatus to be protected and a circuit (42) to which the output signals of the sensors ($U_1$, $U_2$) are fed. The circuit (42) carries out an exchange of data with the electronic control unit (10) in order to control its operational capability, the output signals of the sensors ($U_1$, $U_2$) influencing the exchange of data according to the detected operating state such that the electronic control unit (10) is only operative in a prescribed operating state of the apparatus to be protected. For this purpose, the circuit (42) has a memory (44) in which at least one predetermined code is stored. The electronic control unit (10) is only operative if, on requesting at least one predetermined code (A) from the memory (44) of the circuit (42), it also receives the said code (A) from the circuit (42).

8 Claims, 6 Drawing Sheets

| Sensor $U_1$ | Sensor $U_2$ | Type of Data |
|---|---|---|
| covered | uncovered | no data |
| uncovered | uncovered | no data |
| covered | covered | 8-bit data |
| uncovered | covered | 16-bit data |

Figure 6

SECURITY DEVICE

This application is a Continuation of application Ser. No. 08/411,781, filed as PCT/DE93/00953 Dec. 8, 1993, published as WO94/08823 Apr. 28, 1994, now abandoned.

PRIOR ART

The present invention relates to a security device of the generic type of the main claim, in particular for use in motor vehicles.

Security devices for motor vehicles usually contain both mechanical and electrical apparatuses. Mechanical apparatuses are generally based on blocking the steering wheel in that a lock which is to be actuated by means of a key prevents the said key from rotating. An electronic apparatus of this kind is known for example from the Australian application No. 68 203/90 whose subject matter is included in the present application. In this application, an electrical apparatus is disclosed which permits electronic immobilization, for example by blocking the injection system.

The major part of the previously customary electronic devices for immobilizing vehicles is realized as a simple on/off type which can be bypassed relatively easily, if necessary using suitable resources. This takes place in a simple way in that the ignition contact is shortcircuited.

The object of the present invention is to specify a security device which is not based on a simple switch-on/switch-off principle and which can only be bypassed with difficulty.

SUMMARY OF THE INVENTION

This object is achieved by means of a security device with the characterizing features of the main claim. Advantageously, the security device according to the invention has an electronic control unit for controlling the operation of an apparatus to be protected, a plurality of sensors for detecting specific operating parameters of the apparatus to be protected and a safety circuit which is connected to the sensors and is influenced by them. When starting up occurs, the electronic control unit tests the security circuit and controls the operation of the apparatus to be protected as a function of the result of this test.

Advantageously, the security circuit and the electronic control unit each have a memory in which identical security codes are stored. During the testing of the security circuit; at least one code is transmitted from its memory to the electronic control unit. If one of the sensors determines that an operating parameter has assumed an unacceptable value, the transmission of the codes is scrambled or terminated.

In a preferred embodiment, the sensors monitor the axial and/or the angular position of the shaft of a motor vehicle steering lock.

An exemplary embodiment of the proposed security device is explained in greater detail below with reference to the drawing.

BRIEF DESCRIPTION OF THE DRAWINGS

FIGS. 2a to 5a and 2b to 5b are cross-section and plan views, respectively, showing different operating states of a security device according to the invention arranged on a steering lock of a motor vehicle corresponding to FIGS. 2 to 5. FIG. 6 shows a table of the possible operating states.

DETAILED DESCRIPTION OF THE PREFERRED EMBODIMENT

Figure 1:
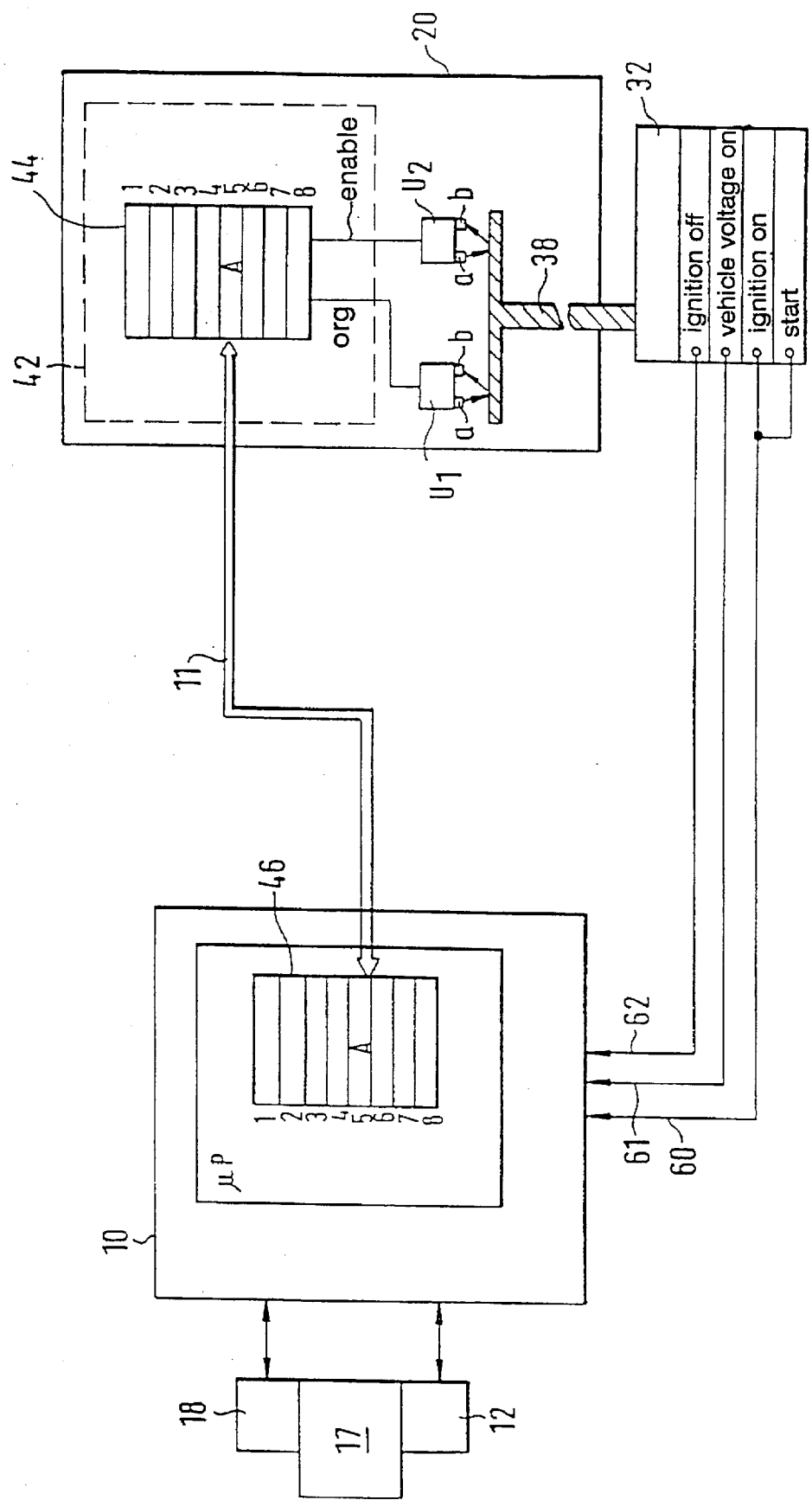
FIG. 1 is a schematic view of the design of the security device according to the invention in use in a motor vehicle.

In FIG. 1, the reference number 10 designates an electronic control unit which in the application in a motor vehicle, as assumed here, serves for example to control an engine starter relay 18 and/or an engine control device 12 which itself monitors in particular the ignition and the gasoline supply of the engine 17. Expediently, in order to avoid a large number of circuits which would otherwise be required it consists essentially of one microprocessor.

An electronic circuit 42 which is arranged in the base 22 of an ignition lock housing 24 is connected via a data line 11 to the control unit 10. In the ignition lock housing 24 there is also a shaft 26 which is turned with the locking cylinder 27 (illustrated) schematically of the ignition lock. The shaft 26 has a coupling element 28 which engages in a corresponding complementary coupling element on an ignition switch 32. Both coupling elements 28, 30 can be secured by a pin 34. The ignition switch 32 is located inside the base 22 and is attached by means of driver pins 36. At the shaft-side coupling element 28, a reflective vane 38 in the form of a circular disc out of which an angular segment has been cut out is arranged coaxicily. Under the vane 38 there is a printed circuit board 40 on which the electronic circuit 42 is arranged. Furthermore, on the printed circuit board 40 there are two sensors $U_1$ and $U_2$ for detecting the position of the vane 38. In the exemplary embodiment described here, the sensors $U_1$, $U_2$ are electro-optical sensors which both transmit and receive visible radiation. The sensors can, however, also be realized as magnetic sensors, Reed switches, ultrasonic sensors, radio frequency sensors, mechanical switches or comparable arrangements. Each sensor $U_1$, $U_2$ has both an emitter a for transmitting light and a detector b for detecting incident light, in particular light reflected from the vane 38 and/or ambient light. The arrangement of the vane 38 and sensors $U_1$, $U_2$ is constructed such that if the vane 38 covers a sensor $U_1$, $U_2$, the radiation emitted by the emitter a of this sensor $U_1$, $U_2$ is reflected onto the detector b. A circuit 42 which contains a read only memory 44, expediently in the form of an electrically erasable, programable read only memory (EEPROM) is connected to the sensors $U_1$, $U_2$. The memory 44 can however also be a RAM, ROM, EPROM, flash memory or any other type of memory. If an EEPROM is used as memory 44, the circuit 42 only requires four external inputs or outputs since an EEPROM is a component which operates serially, the said inputs and outputs being earth, the voltage supply, chip-select counter and data input/output. The outlay on wiring with such a design is low.

Figure 2A:
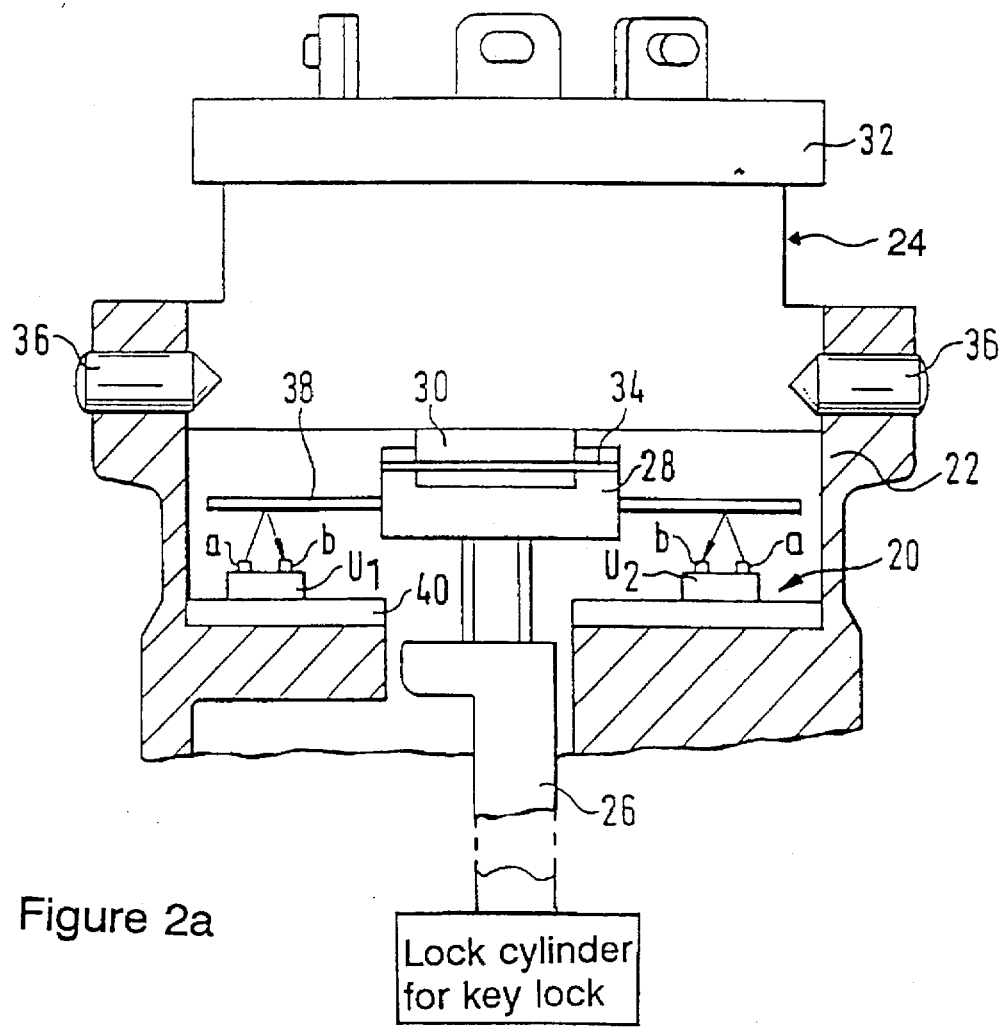
Figure 2B:
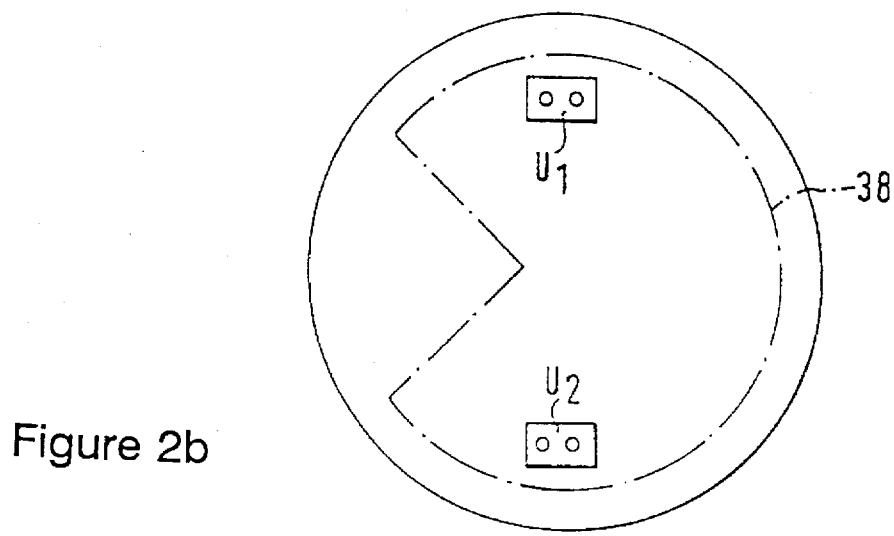
Figure 3A:
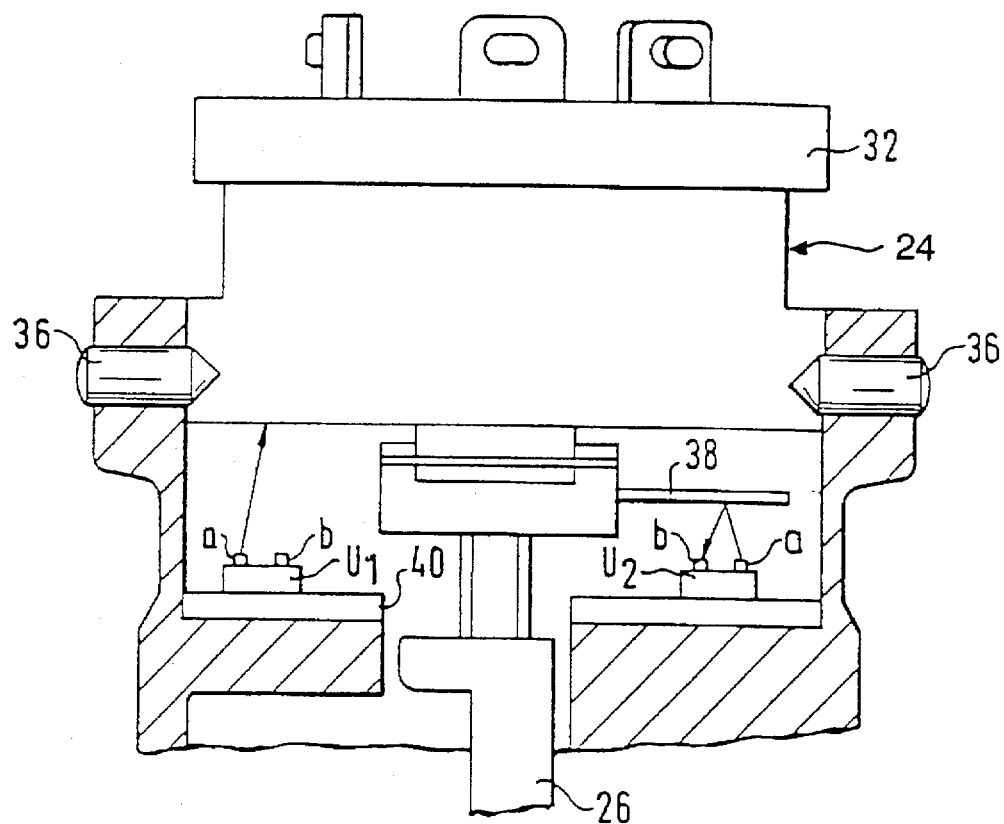
Figure 3B:
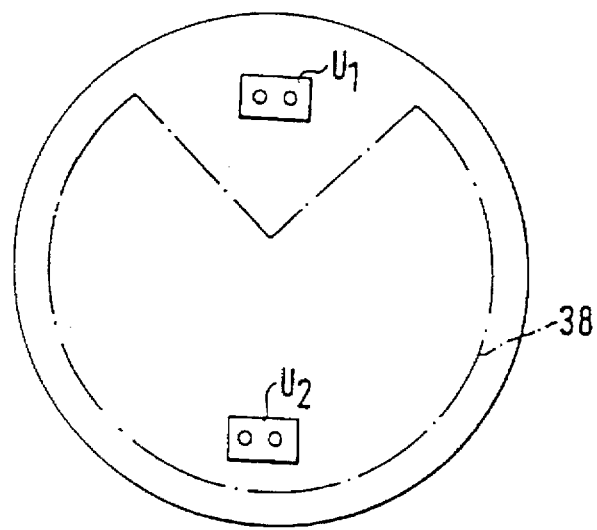

As illustrated in FIGS. 2 and 3, the sensor $U_2$ is always covered by the vane 38 during normal operation. If the vane 38 or the ignition switch 32 are removed, the sensor $U_2$ detects this by the absence of the signal reflected by the vane 38. The second sensor $U_1$ detects the position of the shaft 26 by reference to the position of the vane 38 connected to the said shaft 26. The position of the shaft 26 itself determines the position of the ignition switch 32 which, as indicated in FIG. 1, is in turn detected by the control 10 via inputs 60, 61 and 62. Usually, the ignition switch 32 can assume the positions "ignition off", input 62; "vehicle voltage on", input 61; and "ignition on" and "start", input 60. As indicated in FIG. 2, in the position "ignition off" the vane 38 covers both sensor $U_1$ and sensor $U_2$. On the other hand, as shown in FIG. 3, in the start/ignition position, the vane 38 is turned in such a way that the cut out segment of the vane 38 is located directly over the sensor $U_1$, and as a result the latter is not covered by the vane 38. Light emitted by the sensor $U_1$ is correspondingly not reflected from the vane 38 in this position. The output of the sensor $U_1$ is connected to the "ORG" pin of the memory 44. By means of the latter, the sensor $U_1$ controls whether the memory outputs 8-bit or 16-bit data. The sensor $U_1$ is connected on the output side to the "ENABLE" or "CS" pin of the memory 44. According to its state, it activates or deactivates the memory 44. In the memory 44, there are for example eight codes stored in memory positions 1 to 8. The precise number and form of the codes depends on the respective requirements.

In the exemplary embodiment described, the code is designed in such a way that a different code is assigned to each vehicle. The probability that two vehicles are assigned the same code is in this case smaller than 1:16 million. In the memory 46 of the electronic control unit 10, codes identical to those arranged in the memory 44 are stored. As illustrated in FIG. 1, the intention in the exemplary embodiment is that the positions 5 of both memories 44 and 46 each contain the identical code A.

The mode of operation of the security device is described below. If, during the operation or during the starting up of the apparatus to be protected, here a motor vehicle, the electronic control unit 10 detects, in the exemplary embodiment particularly by reference to the movement of the ignition switch 32 into the position "ignition/start" that processing of security or diagnostic data is required, the said control unit 10 initially transmits a serial data train via the data line 11 to the electronic circuit 42 which causes a specific contents of the memory 44 to be read out. For this purpose, such a data train typically contains a start bit, a code for initiating the read function and an address which designates the selected memory contents. The circuit 42 interprets the serial data train and transmits back the contents, determined by it, out of the memory 44, for example the code A to the electronic control unit 10. The latter tests the code received from the circuit 42 for correctness, in particular by comparison with the identical code A stored in the memory 46. If the code sent back to the control unit 10 is not correct, starting up of the vehicle or of the apparatus to be protected is prevented. Since electrical faults may possibly occur in particular in a vehicle, it is appropriate to exchange in each case at least three different codes in this way between the circuit 42 and electronic control unit 10. If at least two of the codes interrogated in the circuit 42 by the electronic control unit 10 are correct, the vehicle is enabled so that it can be started. If the ignition switch 32 is in the "off" position, as illustrated in FIG. 2, the vane 38 covers both sensors $U_1$ and $U_2$. As represented in FIG. 6, in this case via the ORG pin of the memory 44, the sensor $U_1$ has the effect that only 8-bit data, instead of 16-bit data can be transmitted. In the exemplary embodiment according to FIG. 2, this means that an incorrect response code is transmitted to the control unit 10. The vehicle or the apparatus to be protected cannot be started up. If the shaft 26 is moved from the "off" position into the "start/ignition" position, the cut out circular segment of the vane 38 lies opposite the sensor $U_1$. In this case, the ORG pin of the memory 44 is activated in order to transmit 16-bit data. If at least two of three codes requested by the electronic control unit 10 have been transmitted correctly, the electronic control unit 10 enables the engine control device 12 which subsequently activates the injection system and closes the engine starter relay 18. The vehicle, or generally the apparatus to be protected, can then be started up.

Figure 5A:
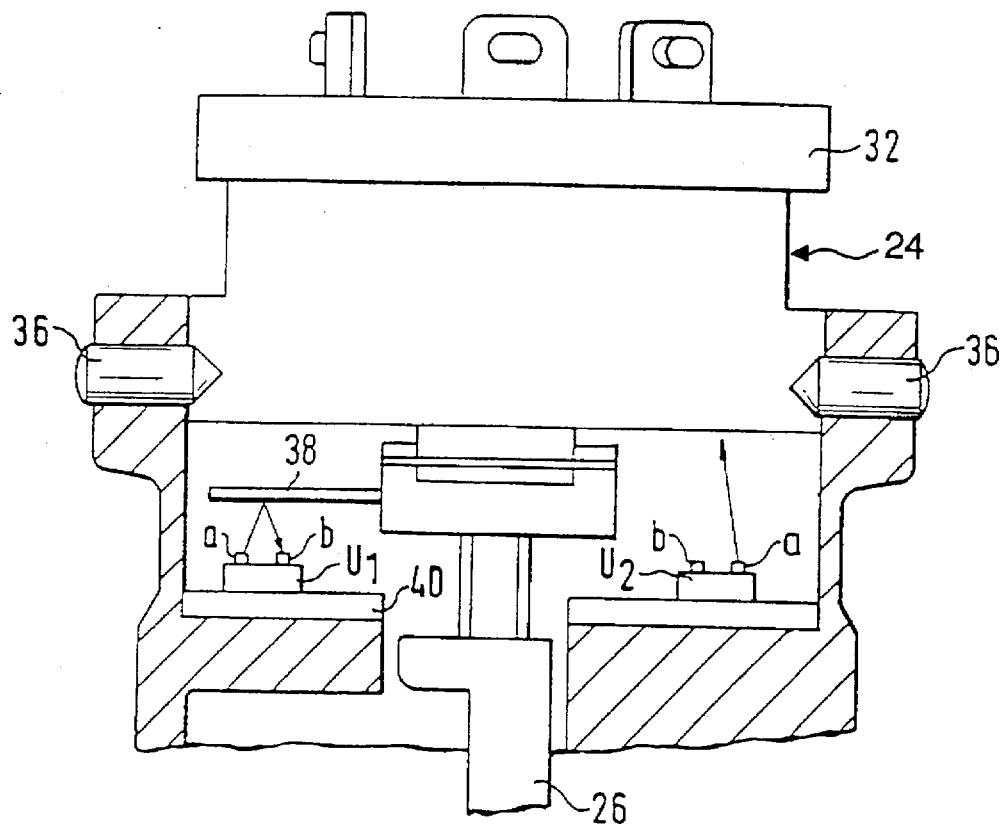
Figure 5B:
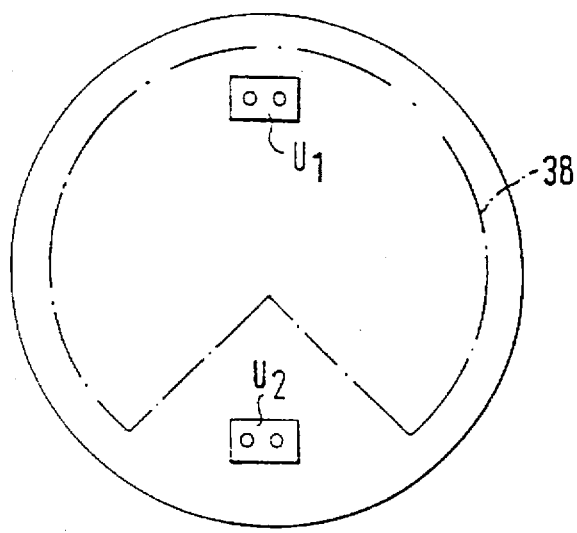

If the shaft 26 is rotated incorrectly, as indicated in FIG. 5, only the sensor $U_1$, but not the sensor $U_2$ is covered by the vane. As a result, the sensor $U_2$ deactivates the memory 44 via the ENABLE pin. As illustrated in FIG. 6, no data are transmitted to the electronic control unit and the vehicle cannot be started.

Figure 4A:
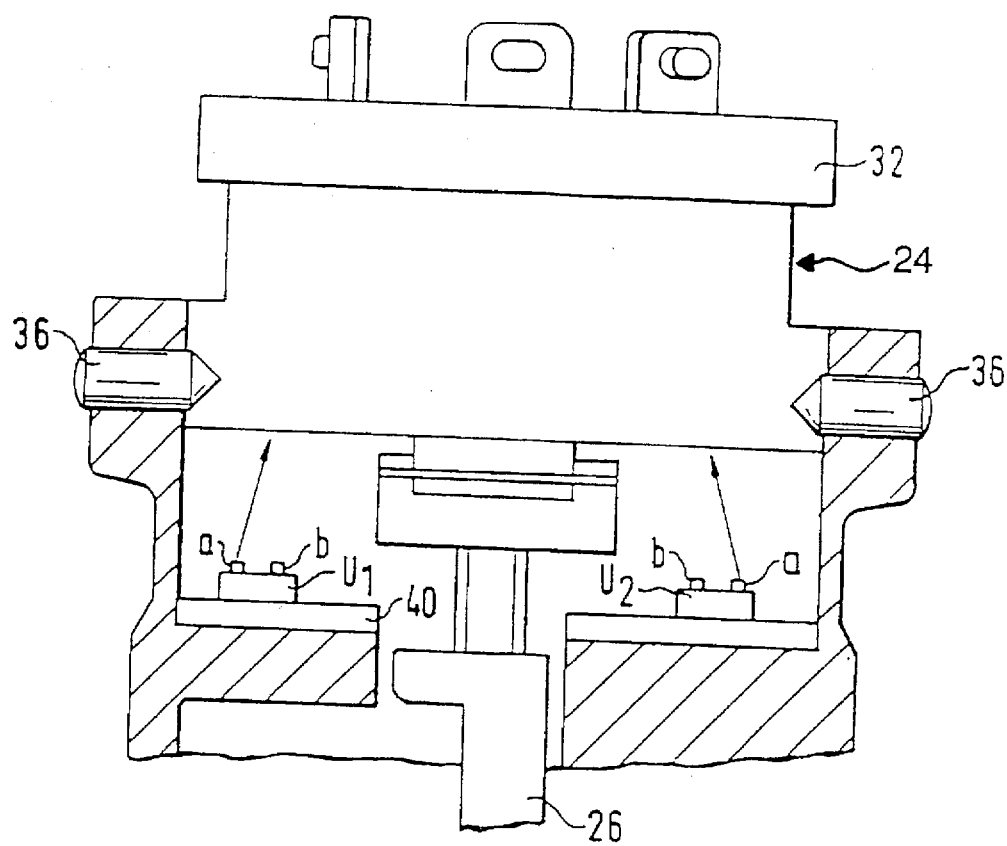
Figure 4B:
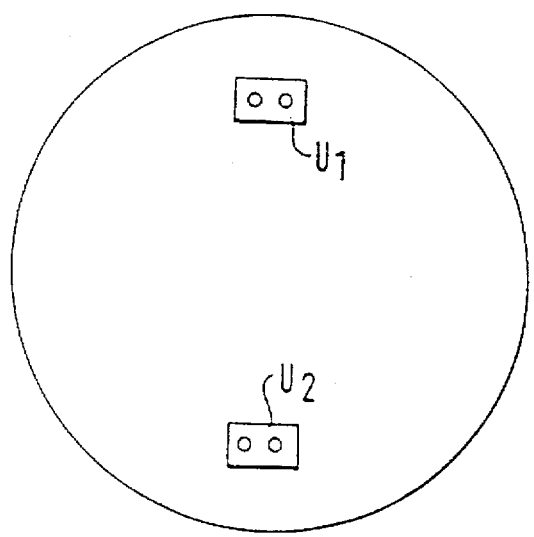

In the case of an attempt to short-circuit the vehicle, the ignition signal on the line 61 initially triggers a transmission of data via the electronic control unit 10. Since the shaft 26, and with it, the ignition switch 32 is however unchanged in the "off" position, the sensor $U_1$ remains covered by the vane 38, as a result of which, as illustrated in FIG. 6, only 8-bit data are transmitted from the circuit 42 to the electronic control unit 10. In the exemplary embodiment described here, an 8-bit data train corresponds to an incorrect code. Therefore, engine and starter functions are not enabled. If, on the other hand, the ignition switch 32 is removed, for example violently, so that the situation indicated in FIG. 4 is present, both sensors $U_1$ and $U_2$ are exposed. Since sensor $U_2$ does not receive any reflected signals in this case, the transmission of data from the circuit 42 to the electronic control unit 10 is blocked. The only possible way of exposing the sensor $U_1$ in the correct way consists in moving the vane 38 into the correct position, illustrated in FIG. 3, by turning the shaft 26. Since the shaft 26 is in turn connected to the closing cylinder of the ignition lock, the correct key must be used in order to bring about rotation of the shaft 26. Since, in addition, the transmission of digital data only takes place within the security device, it is difficult for an unauthorized user to penetrate the line system of the security device in order to bypass it.

The security device described can be retrofitted easily to existing vehicles both with and without an engine control device. In addition, it is possible to integrate the security device into the engine management system.

Although the exemplary embodiment described above related to a motor vehicle, it is equally possible to use a similar security device in other applications also, for example to protect houses or industrial plant.

In addition, the underlying concept can be retaomed as the basis for a wide range of variations, in particular regarding the shape, the design and the arrangement of the components used.

We claim:

1. A security device, preferably for motor vehicles, comprising:

an electronic control unit for controlling the functions of an apparatus to be protected;

a mechanical input means, which can be set to various positions with the aid of a suitable key, and which provides an electrical signal to said control unit corresponding to its set position, for causing said electronic control unit, when in a condition of operational readiness, to actuate the apparatus to be protected;

at least two sensors for detecting specific local positions of said mechanical input means and for providing corresponding output signals;

a circuit which is disposed in the apparatus to be protected, which is provided with a memory in which a vehicle-specific code is stored, which receives the output signals of said sensors, and whose readout of said memory is controlled by said output signals;

wherein said electronic control unit carries out an exchange of data with said circuit in order to check the vehicle-specific code stored in said memory of said circuit and to control the operational readiness of said electronic control unit to actuate the apparatus to be protected; and, wherein, on the basis of the exchange of data, said electronic control unit can be placed into operational readiness to actuate the apparatus to be protected only if the output signals of said sensors fed to said circuit correspond to a predetermined local position of said mechanical input means.

2. The security device as claimed in claim 1, wherein the electronic control unit is only operative if said control unit, on requesting at least one predetermined code (A) from the memory of the circuit, also receives the said code (A) from the circuit.

3. The security device as claimed in claim 2, wherein said electronic control unit is only operable if, on requesting a prescribed number of predetermined codes from said memory of said circuit, said control unit receives at least a prescribed portion thereof.

4. The security device as claimed in claim 1, wherein, in the case of incorrect positioning of said mechanical input means, at least one of the sensors transmits a signal to the circuit, which signal has the effect that, after reception of a request for the transmission of a code from the electronic control unit, said circuit does not send back any code or sends back a scrambled code to said control unit.

5. The security device as claimed in claim 1, wherein the mechanical input means is locking cylinder of a lock to be activated by means of the key.

6. The security device as claimed in claim 1, wherein one of said sensors is connected to an enable input of said memory in order to control whether said memory is activated.

7. The security device as claimed in claim 1, wherein said sensors are electro-optical sensors.

8. A security device as claimed in claim 1 wherein said circuit is responsive to said output signals from said sensors to supply said control unit with data corresponding to said vehicle-specific code stored in said memory of said circuit only when said output signals of said sensors fed to said circuit correspond to said predetermined local position of said mechanical input means.

* * * * *